Aug. 22, 1944.   C. F. WEBB   2,356,714
CALCULATING MACHINE
Filed May 24, 1939   8 Sheets-Sheet 1

Inventor
Christopher Frederick Webb
by
Busser & Harding
Attorneys

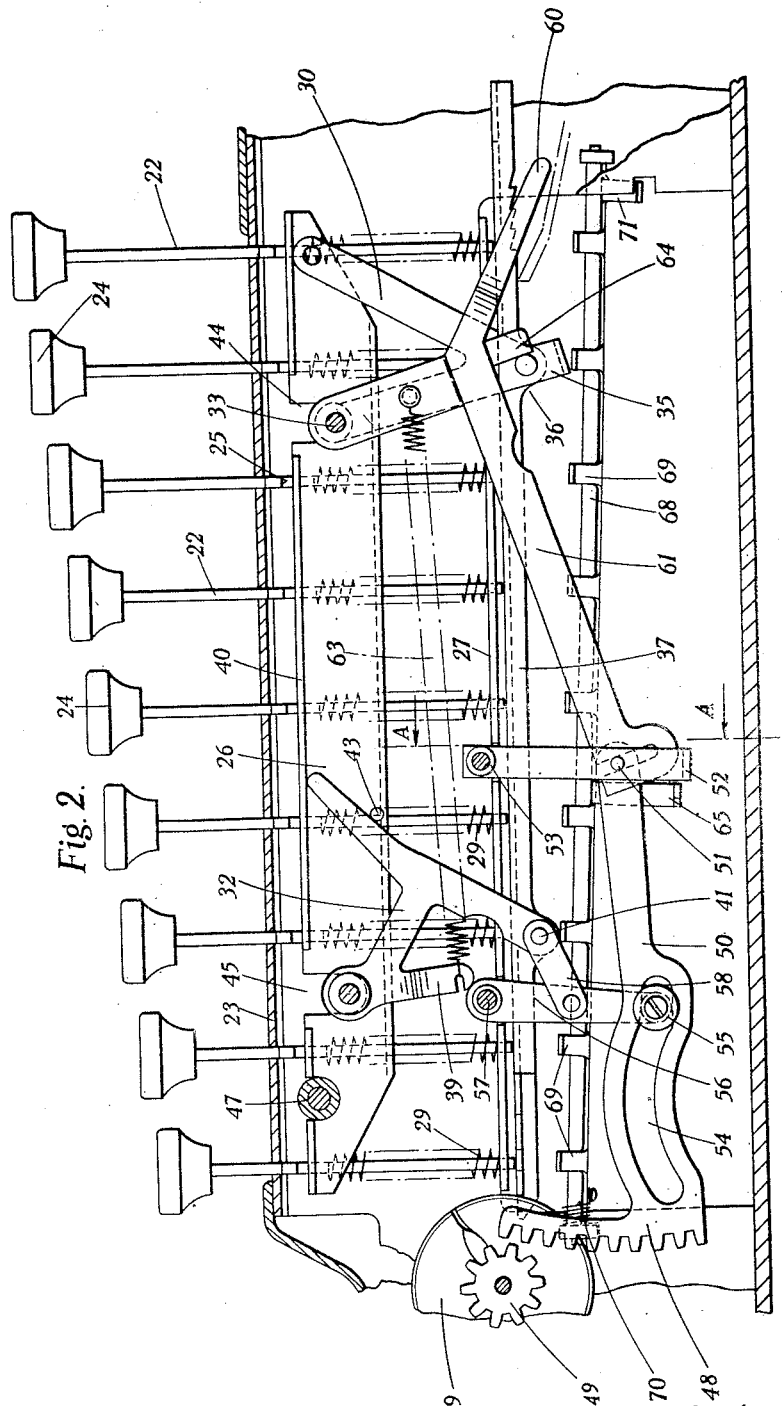

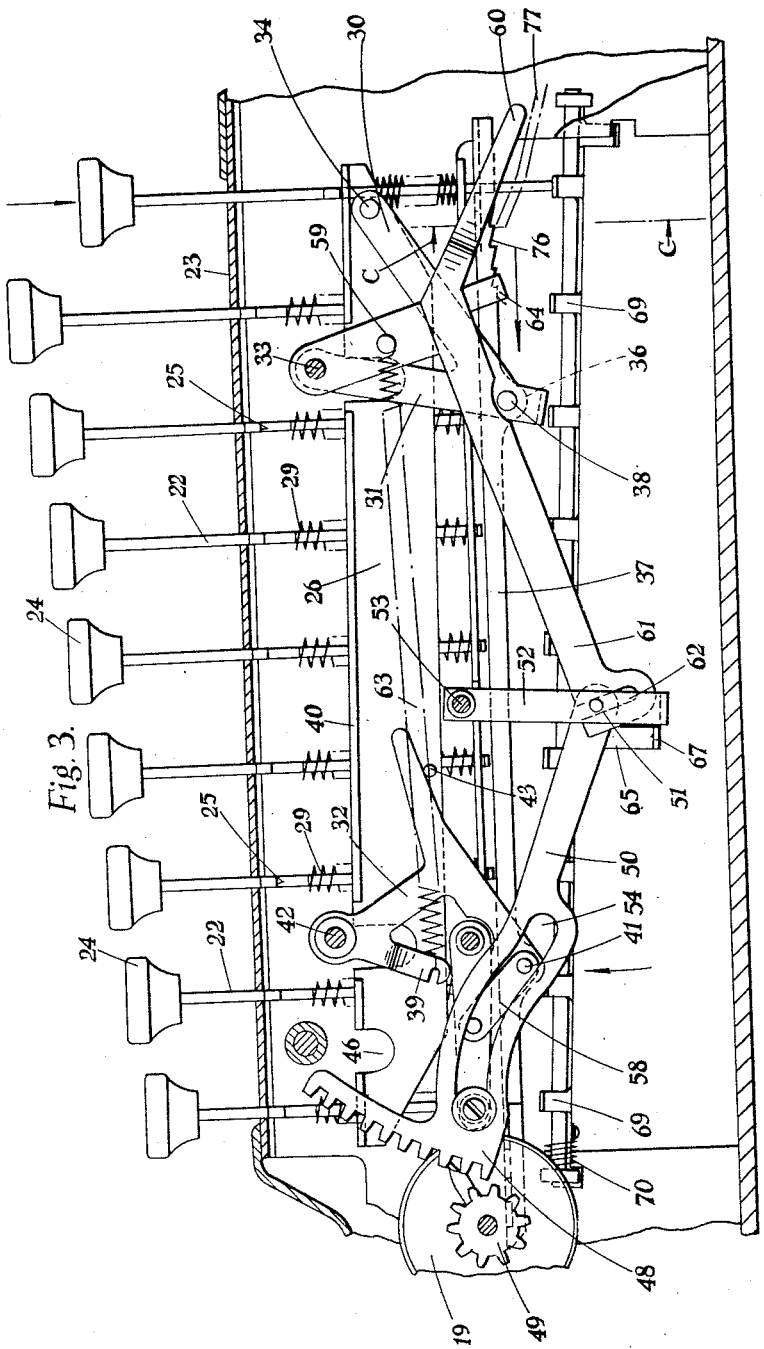

Aug. 22, 1944. C. F. WEBB 2,356,714
CALCULATING MACHINE
Filed May 24, 1939 8 Sheets-Sheet 4

Inventor
Christopher Frederick Webb
by
Busser & Harding
Attorneys

Aug. 22, 1944.   C. F. WEBB   2,356,714
CALCULATING MACHINE
Filed May 24, 1939   8 Sheets-Sheet 5

Inventor
Christopher Frederick Webb
by
Attorneys

Aug. 22, 1944.  C. F. WEBB  2,356,714
CALCULATING MACHINE
Filed May 24, 1939  8 Sheets-Sheet 6

Inventor
Christopher Frederick Webb
by
Attorneys

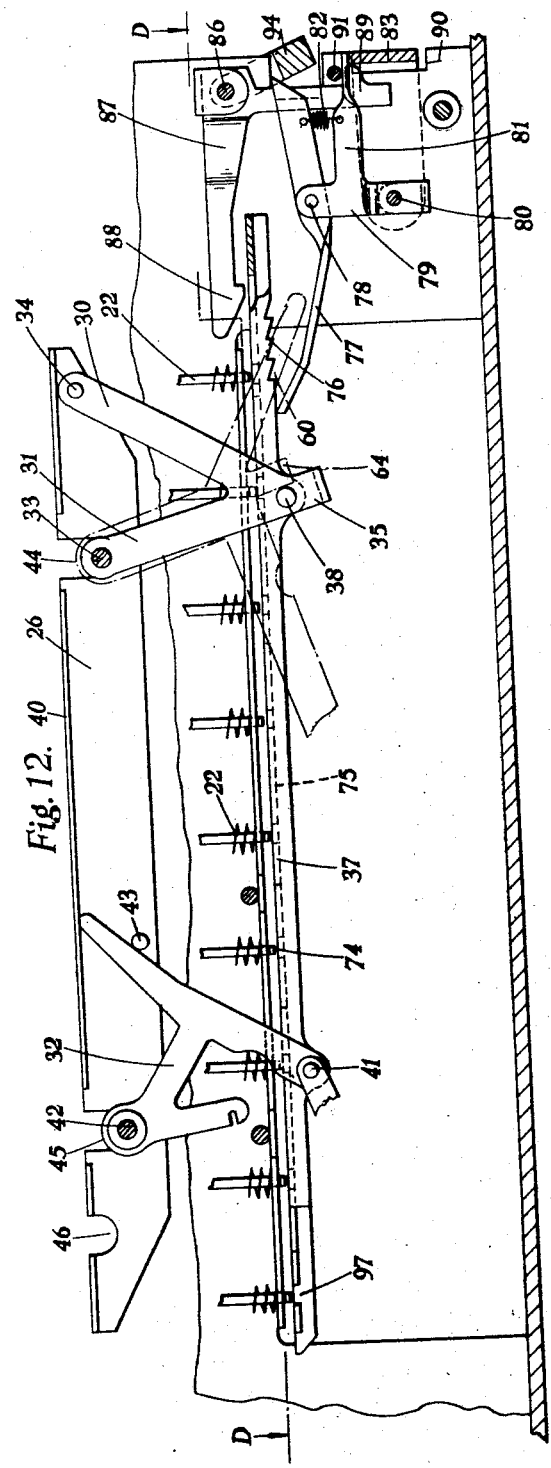
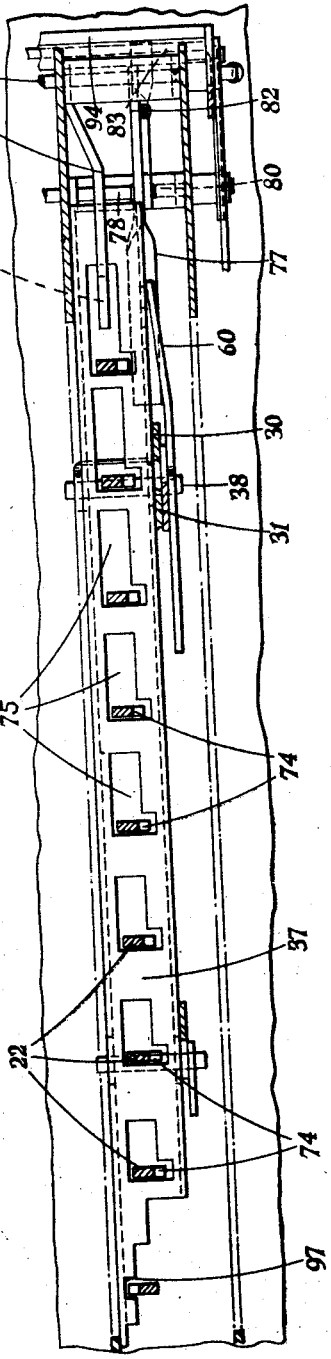

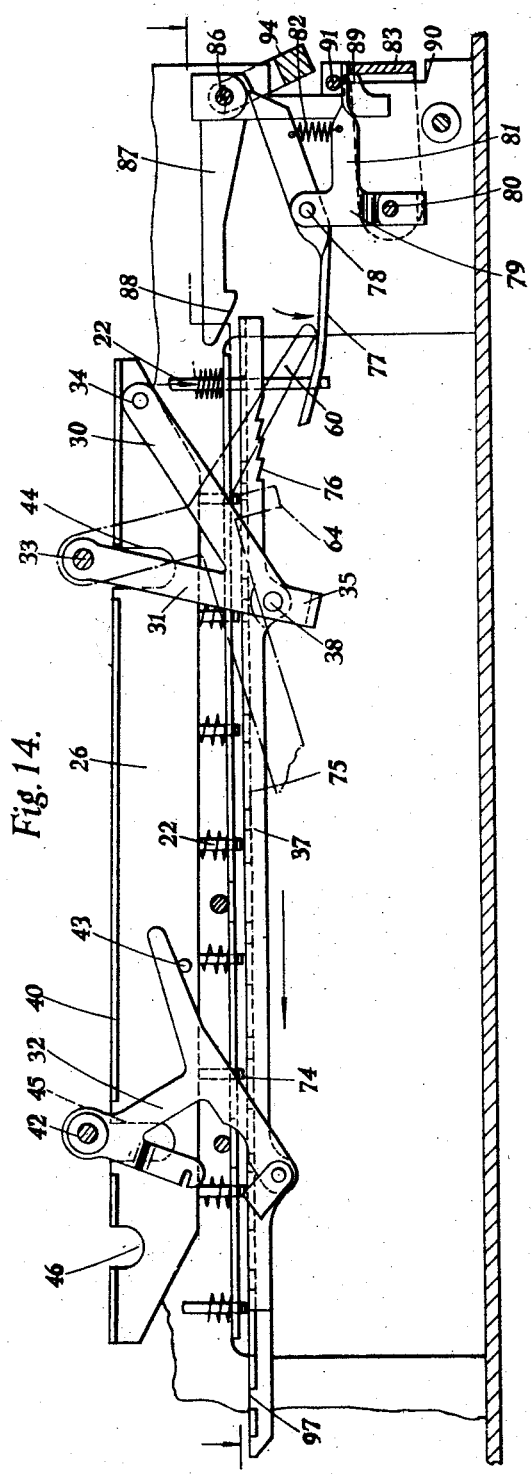
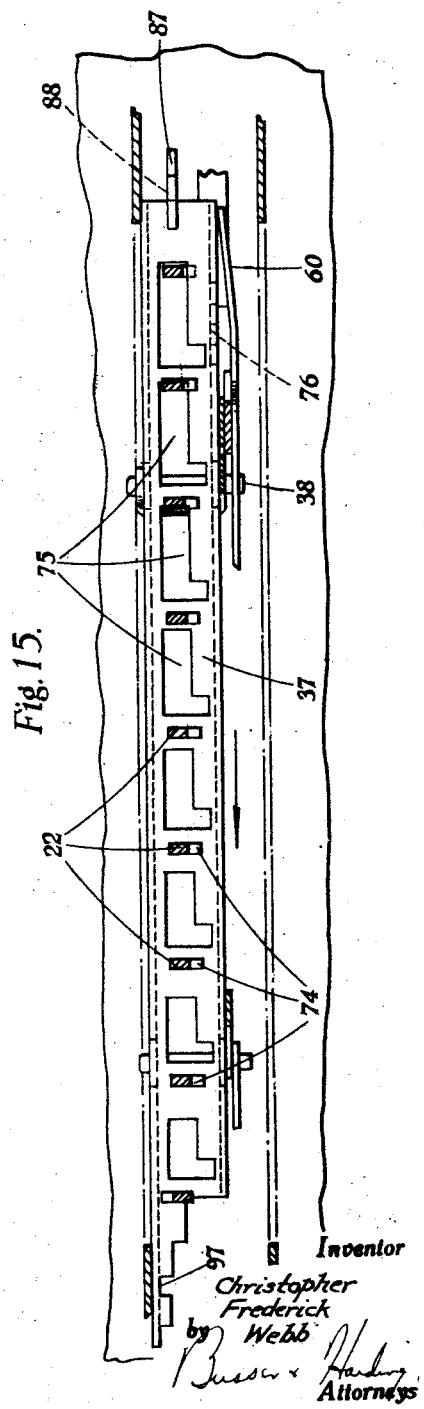
Fig. 14.
Fig. 15.

Patented Aug. 22, 1944

2,356,714

UNITED STATES PATENT OFFICE 2,356,714

CALCULATING MACHINE

Christopher Frederick Webb, Uxbridge, England, assignor to Bell Punch Company Limited, London, England, a British company Application May 24, 1939, Serial No. 275,375
In Great Britain May 28, 1938

12 Claims. (Cl. 235—82)

This invention relates to calculating machines of the key controlled multiple bank type and particularly to machines of this type in which a series of pinions each associated with a figure bearing wheel or so-called totalising mechanism are adapted to be rotated by a corresponding series of oscillatory racks or toothed segments.

In machines of this type any particular pinion may receive motion from two sources (either direct adding or transfer) and as these must be separate in time it is desirable for rapid operation, if, for instance, a pinion is in process of being rotated by the transfer mechanism but such operation has not been completed, that an adding key associated with said pinion can be depressed in preparation for a further rotation of the pinion, such depression having no frictional or other influence on the pinion to interfere with the movement of the latter during the transfer operation.

The present invention provides a rack or toothed segment, which in the position of rest is out of engagement with its corresponding pinion and on depression of a key is moved while remaining out of engagement with the pinion to a position dependent on the particular key actuated, the rack being moved into engagement with the pinion immediately after reaching the position aforesaid and serving to rotate the pinion during its return stroke.

Also in machines of the type first mentioned hitherto proposed the construction is such that the rack, immediately prior to the end of its operative stroke, is moving at a comparatively high velocity, the figure or other wheel which is revolved by the pinion moving into its final position at considerable speed. This gives rise to the well known fault of wheel overthrow and in machines at present in use elaborate precautions have often to be taken in an endeavour to prevent such overthrow consequent on the sudden arrest of the rapidly rotating wheel. In machines of the kind in which the rack is constantly in engagement with the pinion, movement being transmitted from the latter to the wheel through ratchet or other one-way mechanism, special means are necessary for avoiding overrun of the wheel relatively to the pinion, while in machines of the kind wherein the rack disengages the pinion at the end of its operative stroke separate means must be provided for preventing overthrow of the wheel and the pinion after the latter has been freed by the rack.

The invention therefore also provides a rack or toothed segment which is decelerated to zero velocity or substantially to zero velocity at the end of its operative stroke in a comparatively gradual manner so as to bring the wheel gently to rest in its correct position in contradistinction to a sudden arrest.

By "operative stroke" is meant that portion of the movement of the rack wherein the latter engages and rotates the pinion.

Further, in one type of prior calculating machine failure of the operator fully to depress a key results in the locking against further movement of the whole of the keys of the machine with the exception of the keys contained in that bank or line in which is situated the incorrectly actuated key. Subsequent depression and release of any of the keys in this bank or line then serves to lock up the entire keyboard, release of the keys to permit further operation of the machine being effected by the actuation of a special key, lever or other control member. The object of this prior arrangement is to enable the operator after making a false stroke, to correct that stroke by a subsequent full depression so that the correct recording is effected, and the calculation may then be proceeded with after unlocking the keyboard without the necessity of cancelling out and starting the calculation afresh.

With such an arrangement it is possible however, for the operator to depress the wrong key in the line which remains unlocked after the false stroke and the calculation will then be proceeded with without the operator being aware of the error.

In a further type of prior calculating machine a false stroke on any key causes the locking up of the entire keyboard including the key which has been incorrectly actuated, the keyboard then having to be unlocked by a special key or finger piece before the false stroke can be corrected and the calculation continued. In this case the possibility exists of depressing the wrong key after unlocking the keyboard.

Also in each of the above prior types of machine the particular key which has been incorrectly depressed is not visibly identifiable, visual indication being limited in each case to the line or bank in which the false stroke occurred.

According therefore to the present invention each line or bank of keys is provided with a bar or the like extending longitudinally below the keys in the said line or bank, the bar or the like being movable relatively to the keys on depression of a key but being arrested away from its initial position on the finger release of a key which has been incompletely depressed so as to prevent the full restoration of the incompletely depressed key and simultaneously to lock the remaining keys in the machine.

It is to be understood that by the expression "all the keys of the machine" is meant all the keys of the normal keyboard and not necessarily those keys which may be specially provided for enabling the machine to be used for the purpose of subtraction or other operations.

The accompanying drawings illustrate a calculating machine constructed in accordance with the invention.

In the drawings:

Fig. 2 is a cross section through the machine showing the mechanism associated with each bank or "line" of keys, the mechanism being in the "at rest" position and certain parts of the key locking arrangement being omitted.

Fig. 3 is a view similar to Fig. 2 showing the "9" key depressed almost to its fullest extent and the driving rack about to engage the figure wheel pinion.

Fig. 12 is a side elevation corresponding to Fig. 2 showing details of the key locking arrangement according to the present invention, the mechanism being in the normal or "at rest" position.

Fig. 13 is a sectional plan at the line D—D Fig. 12.

Figs. 14 and 15 are sections similar respectively to Figs. 12 and 13 but showing the "9" key depressed to its fullest extent (as in Fig. 4).

Figure 1:
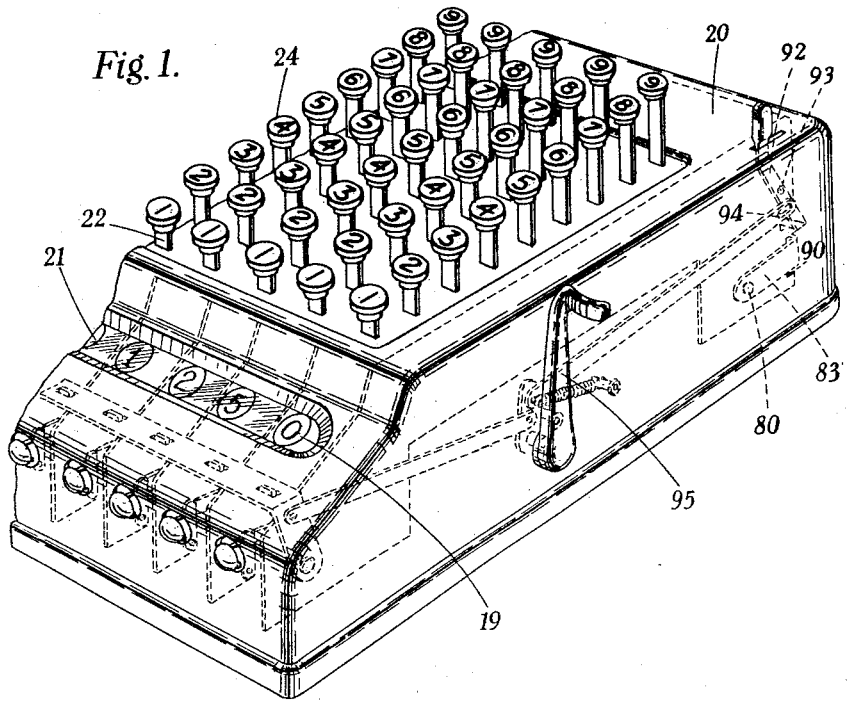
Fig. 1 is a perspective view showing part of the calculating machine.

Referring to the drawings, the calculating machine comprises an outer case 20 having the keys arranged at its upper side. The front of the case is inclined as shown in Fig. 1 and in this front is formed an elongated aperture through which the numbers on the figure wheels 19 can be observed. In the example shown a facia strip 21 is provided in the aforesaid aperture, the strip 21 being formed with holes for viewing the numbers and having a strip of glass covering its outer side. Each bank or "line" contains nine keys numbered 1–9, as many lines as desired being provided, and each line is associated with a system of linkages directly operable by any of the keys in the line in question to rotate the figure wheel associated with that line.

Figure 4:
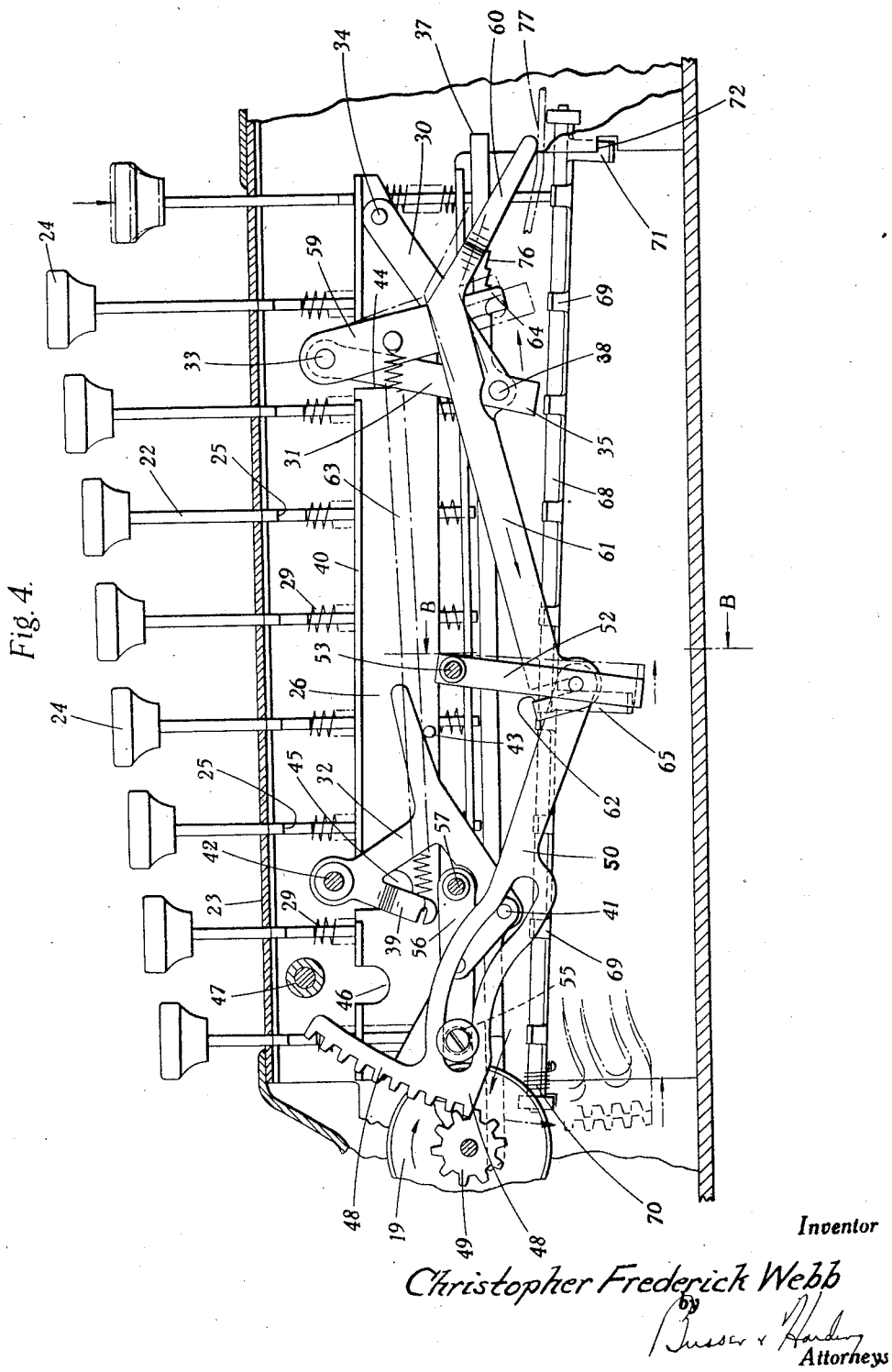
Fig. 4 is a view similar to Figs. 2 and 3 showing the mechanism immediately after the rack has moved into engagement with the pinion.
Figure 5:
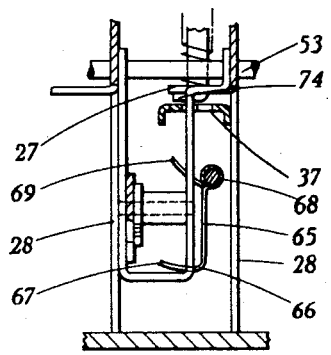
Figs. 5, 6 and 7 are detail cross sections respectively on the lines A—A Fig. 2, B—B Fig. 4, and C—C Fig. 3.
Figure 6:
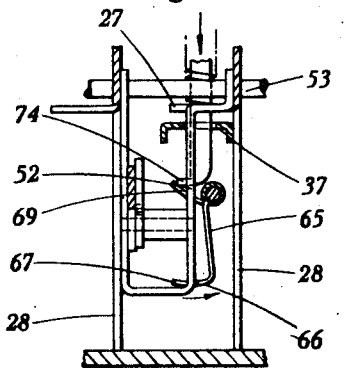
Figure 7:
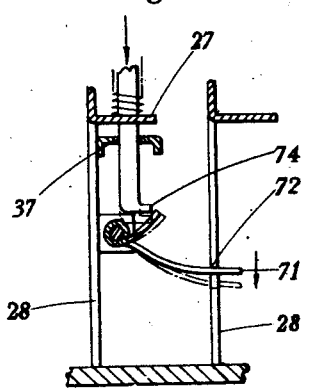

A line of keys and associated linkages is illustrated in Figs. 2–4 and as shown each key comprises a stem 22 arranged to slide in a slot in a cover plate 23, the stem being provided with the usual key top 24 and with a shoulder 25 for engaging a main driving bar 26 extending longitudinally of the line below all the keys therein. The lower portion of each key stem 22 is guided in a slot in a part 27 secured to or formed integrally with a frame plate 28 which serves to separate the line from the adjoining line, and the lower end of each stem is shaped to the form of a hook 74 as best illustrated in Figs. 5–7. Also each stem is acted upon by a spring 29 for restoring the key to its normal position after depression thereof, upward movement of the key being limited by abutment of the lower hook shaped end of the stem against the underside of the part 27 as shown in Fig. 5. When the keys are in their fully raised positions their lower ends are at the same horizontal level, as shown in Figs. 2 and 12.

The driving bar 26 is mounted for substantially parallel movement in a vertical plane, being supported at its rear end by a V-shaped link having arms 30, 31 and near its front end by a link 32 of the configuration shown. The arm 31 of the V-shaped link is rotatably mounted at its upper end on a spindle 33 extending completely through the machine and the arm 30 is pivotally connected at its upper end by a pin 34 to the bar 26, the lower portion 35 of the V-link being bent transversely of the link into a U-form to embrace a pair of ears 36 on opposite sides of a locking bar 37, hereinafter referred to as the locking bar, extending longitudinally of the line of keys parallel to the driving bar 26, the U-shaped portion 35 being pivotally connected to the ears 36 by a pin 38.

The link 32 is rotatably mounted on a spindle 42 extending through the machine parallel to the spindle 33 and consists of an inverted T-shaped part having a tail 39 for a purpose hereinafter described, one end of the bar of the T-part normally abutting as shown in Figs. 2 and 12 against the underside of a flange 40 at the upper side of the bar 26 and the other end of the bar of the T-part being pivotally connected by a pin 41 to an ear on the locking bar 37 near the front end thereof. The driving bar 26 is also provided with a stud or other projection 43 adapted to engage the inverted T-part under the conditions referred to below and in the upper side of the bar 26 are formed three recesses 44, 45, 46 for engagement respectively with the spindles 33, 42 and a transverse bush 47 as shown in Fig. 2 so as to limit the upward movement of the bar 26.

When the driving bar 26 is forced downwardly by depression of any of the keys numbered 1–8 it will move substantially parallel to itself throughout its stroke, the movement being through a slight arc by reason of the mounting of the bar. Simultaneously the locking bar 37 will be moved longitudinally in a forward direction (i. e. towards the figure wheel 19) also through a slight arc, the pin 38 swinging about the center 33 and the pin 41 about the center 42. When key No. 9 is depressed the movement will be substantially the same as above described except that the driving bar 26 will first swing through a small angle in a clockwise direction as viewed in Figs. 2–4 around the pivot 34 in view of the fact that the point of engagement of the key stem with the bar is now on the other side of the pivot 34, this rotation being eventually arrested by engagement of the stud 43 with the link 32. Subsequent to such engagement the driving bar 26 moves substantially parallel to itself into the positions illustrated in Figs. 3 and 4, the former figure showing the parts immediately before key No. 9 completes its downward stroke and the latter figure showing the key at the completion of such stroke.

The locking bar 37 is of inverted-U cross section and as best illustrated in Figs. 13 and 15 is formed with a series of slots 75 arranged one below each of the stems of keys Nos. 2-9. The slots 75 are shaped to the form of the letter L as shown, the foot of the L being arranged directly below the hooked end of the key stem when the latter is in its normal or uppermost position. When the key is depressed the hooked end 74 of the stem first passes through the foot of the L-shaped slot, continued downward movement of the stem serving to engage the shoulder 25 with the driving bar 26 to move the locking bar 37 in a direction substantially at right angles to the key stem. At the commencement of the movement of the locking bar the foot of the L slot moves out of line with the hooked end 74, and the movement of the key is ultimately limited by abutment of the rear of the slot against the depressed stem.

Figure 19:
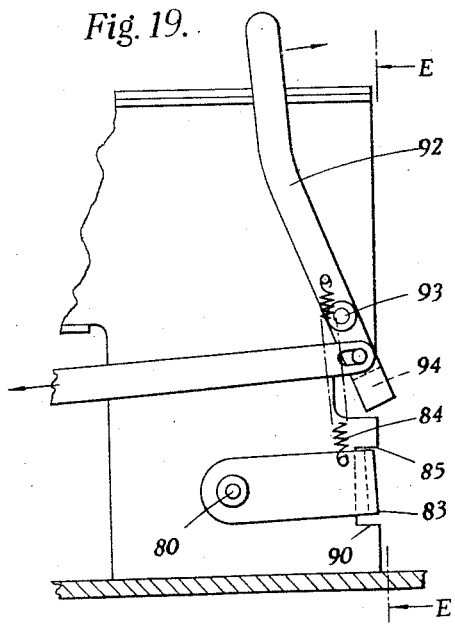
Figs. 19 and 20 are respectively a side elevation and a rear elevation looking in the direction of the arrows E—E Fig. 19, showing the manually actuated means for unlocking the keyboard after correction of a false stroke.

The locking bar is also formed near its rear end with a number of teeth 76 for engagement under the conditions hereinafter described by the front end of a lever 77 pivotally mounted at 78 on the upper end of a part 79 rotatably mounted at its lower end on a fixed spindle 80. The part 79 is formed with a rearwardly extending arm 81 to which the lever 77 is connected by a spring 82, the latter tending to rotate the lever 77 in a clockwise direction to engage its front end with the locking bar 37, and normally the rear end of the arm 81 is located above but clear of a retaining bar 83 extending the entire length of the calculating machine behind each of the lines therein. The ends of the bar 83 are bent at right angles to the main part of the bar, one of such ends being shown in Figs. 1 and 19 and the bar is rotatably mounted by means of these ends on the spindle 80. Also the bar 83 is acted upon by a spring 84 tending to lift it, upward movement of the bar being limited by its abutment against suitable stop surfaces 85.

Pivotally mounted on a spindle 86 extending completely through the machine is a bellcrank 87 having the end of one arm shaped to form a hook 88, this hook being normally located above the rear end of the rearmost slot 75 in the locking bar and being arranged under the conditions hereinafter described to move into said slot and hold the locking bar 37 against forward movement. The bellcrank 87 is held in its normal position illustrated in Fig. 12 with the hook 88 clear of the locking bar, by the abutment of a projection 89 on its vertical arm against the retaining bar 83, the bellcrank being rotated in a counter-clockwise direction under the influence of its own weight or a spring (not shown) to engage the hook in the locking bar when the retaining bar 83 is moved downwardly. Downward movement of the retaining bar is limited by suitable stop surfaces 90; also upward movement of the arm 81 is limited by a rod 91 extending completely through the machine.

It will be understood that the bellcrank 87 and its associated parts above described are reproduced in every line in the same way as are the driving bar 26, locking bar 37 and their associated parts.

The figure wheel 19 is rotated on actuation of a key by a rack 48 having ten teeth adapted to engage and rotate a ten-toothed pinion 49 connected to the figure wheel. The rack 48 is provided at the front end of an arm 50 rotatably mounted at its rear end on a pin 51 carried in a U-shaped part 52, the latter being pivotally mounted at its upper ends on a spindle 53 extending through the machine parallel to the aforementioned spindles 33, 42, 80, 86. The arm 50 is also formed with an elongated slot 54 of the configuration shown in which engages a roller 55 carried at the lower end of an arm 56, the latter being pivotally mounted at its upper end on a spindle 57 extending through the machine and being connected by a short link 58 to the pin 41 carried on the locking bar 37. In the position of rest shown in Fig. 2 the location of the U-shaped part 52 is such that the rack is held away from the teeth of the pinion 49 and can be swung through an angle into the position shown in Fig. 3 by forward movement of the locking bar 37 without influencing the pinion.

Pivotally mounted on the spindle 33 carrying the V-shaped link 30, 31 is a three-armed lever 59, 60, 61, the arm 61 being formed with a slot 62 in which engages the pin 51 carried in the U-shaped part 52. The location of the slot 62 in the arm 61 is such that rotation of the three-armed lever in a clockwise direction serves to swing the U-part 52 in a clockwise direction and thus move the arm 50 in a direction longitudinally of itself. The arm 59 is connected to the tail 39 on the link 32 by a helical spring 63 which serves to move the rack 48 into engagement with the pinion 49 under the conditions described below and subsequently to return the parts of the mechanism to their initial positions after release of a compressed key, this spring being under a predetermined minimum tension when the mechanism is in the position of rest illustrated in Fig. 2. Also the distance between the center 42 and the point of attachment of the spring 63 to the tail 39 is made greater than the distance between the center 33 and the point of attachment of the spring to the arm 59 for the purpose hereinafter described. In addition the three-armed lever is provided with a tail 64 which is arranged for engagement by the pin 38, the end of the latter projecting laterally of the lower portion 35 of the V-link for this purpose.

The arm 60 is located above the front end of the lever 77 and is arranged to engage the latter in the circumstances described below.

The U-shaped part 52 is associated with a movable retaining arm 65 having its lower end bent laterally of the main vertical portion of the arm, this lateral end being stepped to form a pair of bearing surfaces 66, 67, best illustrated in Figs. 5 and 6, for one arm of the U-shaped part 52. Fig. 2 shows the U-part 52 separated from the surface 66 by a slight clearance and Fig. 3 shows the part directly abutting against the said surface while Figs. 4 and 6 show the U-part abutting against the surface 67. As shown in the drawings, the arm 65 is carried on a bar or rod 68 extending longitudinally of the line below all the keys therein, this bar being mounted for rotation about its longitudinal axis and being provided with a number of laterally projecting portions 69 one of which is arranged directly below each key stem so as to be engageable by the latter during its downward movement. As illustrated in Figs. 2-4 the bar 68 is not arranged parallel to the driving bar 26 and the locking bar 37 but is inclined thereto, the distance between the lower end of the stem of key No. 1 and the projection 69 situated below that key being a minimum and the corresponding distance for key No. 9 being a maximum. When a key is depressed, the distances moved by the driving bar 26 and the locking bar 37, and hence the angle through which the rack 48 is swung before the lower end of the key stem engages its corresponding projection 69, will thus vary for each key. The bar 68 is associated with a coil spring 70 tending to rotate the bar in a clockwise direction as viewed in Figs. 5 and 6, rotation of the bar in this direction being limited by the abutment of a lateral projection 71 (see particularly Fig. 7) at the rear end of the bar against a suitable stop surface 72.

The operation of the mechanism above described is as follows:

Normally the parts occupy the positions shown in Figs. 2 and 12 with the U-part 52 separated by a slight clearance from the surface 66 on the arm 65, the rack being held in its lowermost position and away from the pinion 49; also the roller 55 is located near the rear end of the slot 54 and the pin 38 is in engagement with the tail 64. Additionally the front end of the lever 77 is engaging the underside of the locking bar and the rear end of the arm 81 is abutting the rod 91 and is clear of the retaining bar 83, the latter being held under spring pressure in its uppermost position wherein it retains the hook 88 of the bellcrank 87 clear of the locking bar.

When a key, for example the nine key, is depressed the driving bar 26 is forced downwardly and moves the locking bar 37 longitudinally in a forward direction, this latter movement through the intermediary of the link 58 and arm 56 serving to swing the arm 50 carrying the rack 48 in a clockwise direction. Immediately before the lower end of the key stem engages its corresponding projection 69 on the bar 68 the parts occupy the positions shown in Fig. 3, with the rack still out of engagement with the pinion, the U-part 52 having moved into engagement with the surface 66 at the commencement of the key stroke and having subsequently remained in engagement with said surface due to the action of spring 63 as described below. Also the end of the lever 77 is abutting the teeth 76 as shown in Fig. 3, the teeth having passed the said lever during forward movement of the locking bar. During downward movement of the key the tension of the spring 63 is increased by reason of the fact that the link 32 is rotated in a clockwise direction while the arm 59 is held stationary, after its very small initial movement to engage the U-part with the surface 66.

At the completion of the downward stroke of the key the lower end of the stem engages its projection 69 to rotate the bar 68 from the position shown in Fig. 5 to that shown in Fig. 6, this movement serving to withdraw the surface 66 from engagement with the U-part 52. The latter is now swung through a small angle in a clockwise direction by the spring 63 acting through the arms 59, 61, the movement of the U-part 52 serving to engage the rack 48 with the pinion 49 and being limited by abutment of the said part against the surface 67. The clockwise rotation of the three-armed lever also causes the arm 60 to engage the lever 77 and move it away from the teeth on the locking bar and thus when the key is in the fully depressed condition the parts occupy the positions shown in Figs. 4 and 14. The engagement of the lever 77 by the arm 60 merely serves to rotate the lever about its pivot 78 and has no effect on the remaining parts of the locking mechanism.

When the key is released the spring 63 acts to rotate the link 32 in a counter-clockwise direction to swing the rack 48 through the various stages shown in full lines in Figs. 8–11, the rack remaining in engagement with the pinion and thus rotating the figure wheel during its return stroke. The figure wheel is therefore rotated during the upstroke of the key. After the rack reaches the bottom of its stroke as shown in full lines in Fig. 11 the pin 38 carried by the locking bar 37, which latter has been moving in a rearward direction during the return stroke of the rack, engages the tail 64 to restore the three-armed lever 59, 60, 61 to its original position, the force exerted by the pin 38 on the tail 64, due to the spring 63 acting through the link 32 and locking bar 37 serving to overcome the opposing force on the tail due to spring tension on the arm 59. This difference in the opposing forces is achieved by suitable arrangement of the dimensions and disposition of the parts concerned and by arranging the anchorage of the front end of the spring 63 at a distance from the center 42 greater than the distance between the anchorage of the rear end of the spring and the center 33. The resetting of the three-armed lever causes the U-part 52 to be swung in a counter clockwise direction to withdraw the rack 48 from engagement with the teeth of the pinion, while such resetting also disengages the arm 60 from the lever 77 to permit the latter to be swung in a clockwise direction into contact with the locking bar 37, the latter having moved back to such a position that the point of engagement of the lever 77 with the locking bar lies in front of the teeth 76 so that no movement is communicated to the lever by the bar. The movement of the U-part 52 also permits the spring 70 to rotate the bar 68 in a clockwise direction as viewed in Figs. 5 and 6 and as the driving bar 26 has in the meantime also been restored to initial position the parts of the mechanism once again assume the positions shown in Figs. 2 and 12.

As previously explained and as will be apparent from the foregoing the angle through which the rack 48 is swung before it is moved into engagement with the pinion, and therefore the angle through which the figure wheel is rotated during the return stroke of the rack, will vary according to the key depressed. In effect each key serves to move the rack through a predetermined distance before moving it into engagement with the pinion and the parts are so arranged that actuation of the first key rotates the figure wheel through an angle of 36°, the second key 72° and so on up to the ninth key which rotates the figure wheel through an angle of 324°.

Also the angular velocity of the figure wheel is reduced to zero or substantially to zero by suitable deceleration of the rack before the latter disengages the pinion. This has the effect of preventing overthrow of the wheel, the latter in the present instance being brought to rest in its correct position before it is freed by the rack. The rack is decelerated towards the end of its stroke by shaping the slot 54 to the configuration shown in the drawings. As illustrated the slot 54 is made convex in an upward direction for the greater part of its length but towards its rear or right-hand end it changes direction, the rear portion being shaped substantially to the form of an arc having the spindle 57 as center. With such an arrangement the rack is accelerated during the initial stages of its return stroke but when the roller 55 reaches approximately the position shown in Fig. 9 the rack commences to decelerate until eventually it comes to rest momentarily in the position shown in full lines in Fig. 11. The rack reaches this latter position before the pin 38 engages the tail 64 so that the rack is moved out of engagement with the pinion 49 only after the latter, and therefore the figure wheel 19, has been brought to rest.

If desired the roller 55 may be replaced by a pair of rollers or pins at the end of the arm 56 arranged to move along opposite sides of the arm 50, the latter being shaped to produce the effect provided by the roller 55 and solt 54.

If the operator inadvertently fails to depress a key to its fullest extent the key does not engage its corresponding projection 69 and the rack is therefore not released into engagement with the pinion. The three-armed lever is therefore not rotated to cause the arm 60 to disengage the lever 77 from the teeth 76 and hence when the key is released and the locking bar 37 starts to move rearwardly the lever 77 is moved bodily by engagement with the teeth 76 to swing the part 79 in a clockwise direction into the position shown in Fig. 16, the arm 81 depressing the retaining bar 83 against the influence of its spring and the parts coming to rest with the locking bar held against further rearward movement and away from its normal rest position. As the locking bar has failed to return to initial position the key which has been depressed is unable to restore fully since the foot of the L-shaped slot 75 is out of line with the hook 74 at the lower end of the stem and the key is therefore held by abutment of the hook against the underside of the locking bar (full lines Fig. 16) in a position below that which it occupies in its initial condition. Moreover the hooked ends of the remaining key stems in the bank are also out of line with the foot-portions of their respective L-slots but in the case of these keys the hooks 74 are situated above the locking bar so that depression of these keys is prevented.

Figure 16:
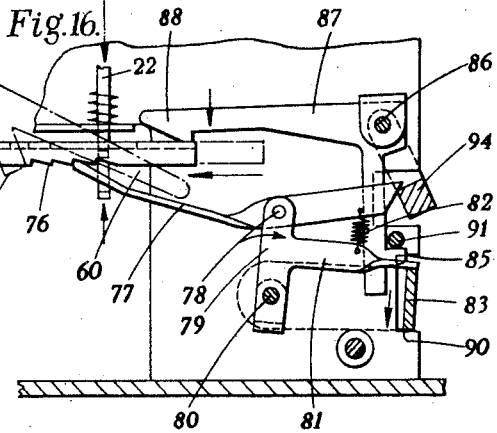
Figs. 16–18 are detail views showing certain parts of the key locking arrangement in three different conditions.

Also, movement of the retaining bar 83 downwardly into the position shown in Fig. 16 on release of the incorrectly depressed key permits the bellcrank 87 to swing in a counterclockwise direction, this movement being limited by abutment of the hook 88 against the upper side of the rear end of the locking bar 37 which latter is held out of initial position. However, downward movement of the bar 83 also serves to release the bellcranks in all the remaining lines of the machine and as the locking bars in these remaining lines have all been restored to their initial positions the bellcrank in each of the said remaining lines is enabled to rotate to engage its hook 88 in the rearmost slot in its corresponding locking bar so as to hold the latter against forward movement. Hence therefore, failure of the operator to depress a key to its fullest extent results in the locking-up against further movement, of the entire keyboard with the exception of that particular key incorrectly actuated. Additionally the top of the key in question is held at a position below that which it normally occupies so that the key is capable of immediate visual identification.

Figure 17:
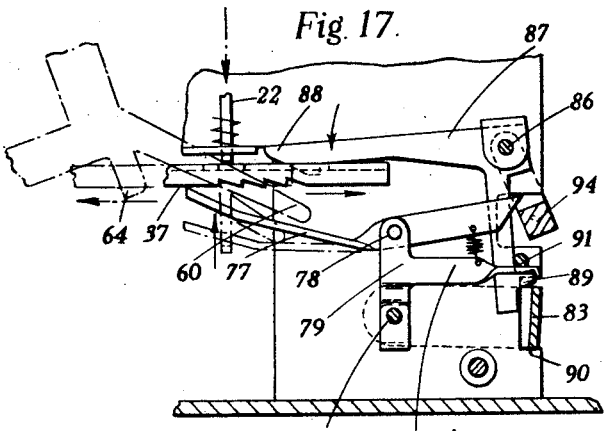

After the operator has been notified of the false stroke by the locking-up of the keyboard the key which was the subject of the false stroke is then depressed its full extent and released, this serving to record the correct figure on the figure wheel. Full depression of the key to the position shown in dot-dash lines in Fig. 17 now causes the lever 77 to be moved to the position also shown in dot-dash lines in that figure, subsequent release of the key enabling the locking bar to return unhindered to initial position. However, since the commencement of the further depression of the incorrectly actuated key the retaining bar 83 has been held in its lowermost position by engagement under the projections 89 on the bellcranks 87 in the remaining lines, which bellcranks it will be remembered had been permitted to rotate sufficiently to engage their hooks 88 in the rearmost slots of their corresponding locking bars, and therefore when the locking bar in the line containing the incorrectly actuated key returns to initial position after further depression of the said key, the bellcrank in that line will be permitted to engage its hook in the rearmost slot of the bar and prevent further forward movement thereof. Hence after depressing to its fullest extent the key on which the false stroke was initially made the entire keyboard is locked up including the key the subject of the false stroke.

It will be apparent that the false stroke had no influence on the figure wheel since the rack was not moved into engagement with the pinion and hence the subsequent correct depression of the key on which the false stroke was made will bring the calculation to exactly the same condition as if the false stroke had never occurred.

Figure 20:
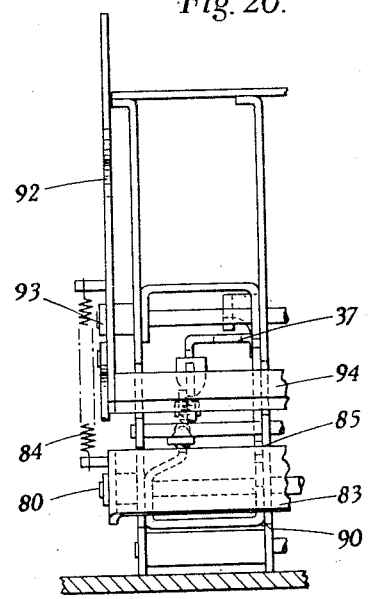
Figure 18:
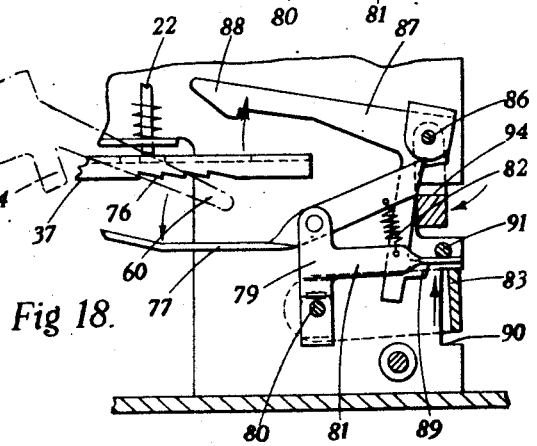
Figure 8:
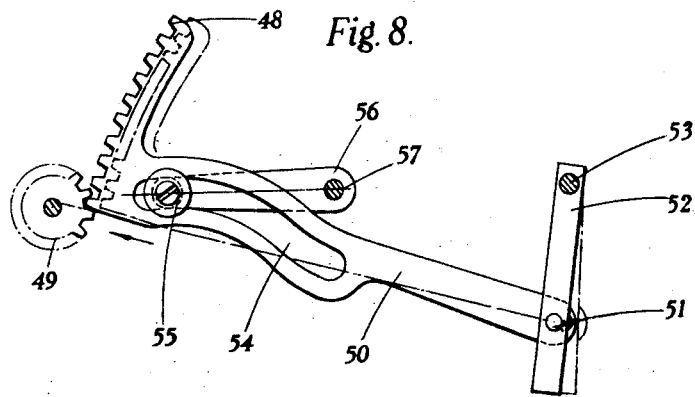
Figs. 8–11 show the rack at various stages of its movement.
Figure 9:
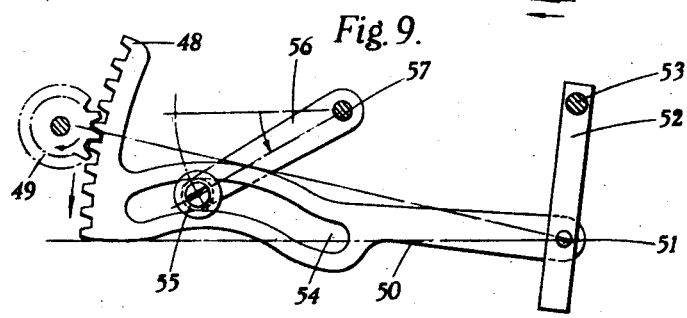
Figure 10:
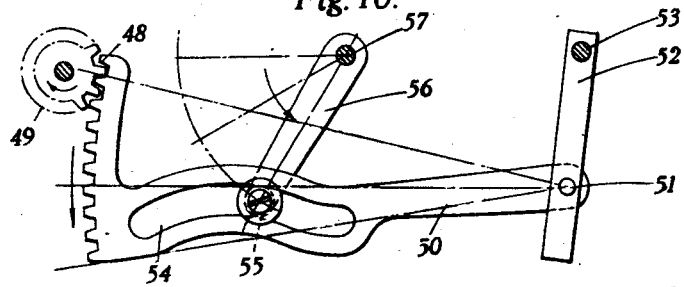
Figure 11:
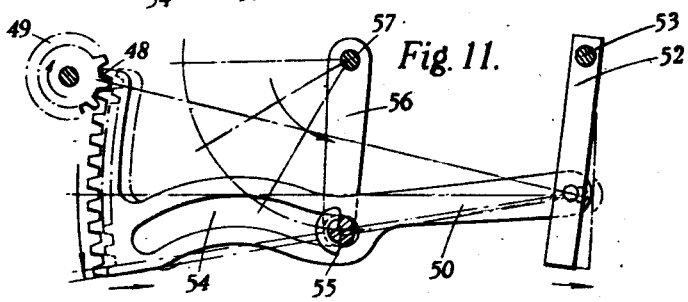

The keys of the machine are unlocked after correction of the error to permit the calculation to be proceeded with, by means of a lever 92 (Figs. 1, 19 and 20) pivotally mounted at 93 and having its upper end extending through a slot in the upper side of the calculating machine. The lever 92 carries a bar 94 extending the length of the machine across the rear of all the lines and when the lever 92 is rotated in a direction away from the operator the bar 94 engages the vertical arms of all the bellcranks as shown in Fig. 18 to permit the retaining bar to be restored to its initial position, the bellcranks returning to the position shown in Figs. 12–15 when the lever 92 is restored to initial position. Such restoration is preferably automatically effected by a spring on releasing the lever and if desired the spring 84 may be employed for the purpose.

As shown in Fig. 1 the machine is provided with the usual handle 95 for zeroising the figure wheels, this handle being connected to the unlocking lever 92 by a pin and slot connection so as to enable actuation of the lever independently of the handle but not conversely. The object of this arrangement is to enable the machine to be properly zeroised if desired after a false stroke, or after the correction of such stroke without the necessity of a separate actuation of the lever 92. When the zeroising handle is actuated after correction of a false stroke the bar 94 is actuated in the manner previously described simultaneously with the zeroising of the figure wheels; when the handle is actuated immediately after the making of the false stroke not only are all the bellcranks rotated as above described but also the bar 94 engages the rear end of the lever 77 in the line containing the incorrectly actuated key and rotates it out of engagement with the locking bar 37 as shown in Fig. 18, the locking bar subsequently restoring to initial position.

In the case of key No. 1 the arrangement differs slightly from that above described. This is due to the necessity of removing a part of the front end of the locking bar 37 so as to prevent interference with other parts at the front of the machine. In the example shown the front end of the locking bar is cut away as illustrated in Figs. 13 and 15 and in this cut-away portion is formed a slot 87 which normally is in line with the hooked end of the stem of key No. 1, the direction of the hook being reversed in comparison with the remaining keys. The slot 87 bears the same relationship to the hooked end of key No. 1 as does the foot of the L-slot 75 to the hook of any of the remaining keys and its function will be immediately apparent.

The spindles 33, 42, 53, 57, 80 and 86, which support the various parts above referred to extend completely through the machine parallel to each other, and serves to support corresponding parts in the mechanisms associated with other lines of keys.

Also certain parts, particularly the driving bar 26, may be provided with holes or recesses for the purpose of reducing weight.

The invention is not limited to the example above described as subordinate details of construction may be varied to meet different requirements. The invention may for example be incorporated in a machine in which the motive power is supplied by an electric motor, the keys in this case serving merely as selecting means.

I claim:

1. In a calculating machine, a pinion to which variable additive movements are imparted in the operation of the machine, a movable rack member normally out of engagement with said pinion, a plurality of keys, means actuable by the keys to effect variable movements of said rack while out of engagement with said pinion dependent upon the key which may be operated, and means for effecting driving engagement of the rack with the pinion simultaneously with the completion of such variable movements of the rack and for maintaining such engagement while the rack is returning to its initial position, said means for effecting driving engagement of the rack with the pinion comprising a lever to which said rack is pivoted and means for swinging said lever to move the rack bodily and mesh it with the pinion at the end of said variable movement of the rack.

2. In a calculating machine, a pinion to which variable additive movements are imparted in the operation of the machine, a movable rack member normally out of engagement with said pinion, a plurality of keys, means actuable by the keys to effect variable movements of said rack while out of engagement with said pinion dependent upon the key which may be operated, and means for effecting driving engagement of the rack with the pinion following such variable movements of the rack and for maintaining such engagement while the rack is returning to its initial position, said means for effecting driving engagement of the rack with the pinion comprising a lever to which said rack is pivoted and means for swinging said lever to move the rack bodily and mesh it with the pinion at the end of said variable movement of the rack, and said means for effecting variable movements of the rack comprising a lever having variable movements and having a cam and follower connection with said rack to move it above its pivotal connection with the first mentioned lever.

3. In a calculating machine, a pinion to which variable additive movements are imparted in the operation of the machine, a movable rack member normally out of engagement with said pinion, a plurality of keys, means actuable by the keys to effect variable movements of said rack while out of engagement with said pinion dependent upon the key which may be operated, and means for effecting driving engagement of the rack with the pinion simultaneously with the completion of such variable movements of the rack and for maintaining such engagement while the rack is returning to its initial position, said rack being pivotally mounted and said means for effecting variable movements of the rack comprising a lever having variable movements and having a cam and follower connection with said rack to move it about its pivotal mountings.

4. In a calculating machine, a pinion to which variable additive movements are imparted in the operation of the machine, a movable rack member normally out of engagement with said pinion, a plurality of keys, means actuable by the keys to effect variable movements of said rack while out of engagement with said pinion dependent upon the key which may be operated, and means for effecting driving engagement of the rack with the pinion only at the completion of such variable movements of the rack and for maintaining such engagement while the rack is returning to its initial position, said means for effecting driving engagement of the rack with the pinion comprising spring means for yieldingly urging said rack towards meshing position during depression of a key, and latch means restraining said urging means during the depression of a key and until the depression thereof is completed and then releasing said urging means to effect meshing.

5. In a calculating machine, a pinion to which variable additive movements are imparted in the operation of the machine, a movable rack member normally out of engagement with said pinion, a plurality of keys, means actuable by the keys to effect variable movements of said rack while out of engagement with said pinion dependent upon the key which may be operated, and means for effecting driving engagement of the rack with the pinion following such variable movements of the rack and for maintaining such engagement while the rack is returning to its initial position, said means for effecting driving engagement of the rack with the pinion comprising a member to which said rack is pivoted and means for moving said member to mesh the rack with the pinion at the end of said variable movement of the rack and also to unmesh the rack and pinion, and said means for effecting variable movements of the rack comprising a device having cam and follower engagement with the rack to exert a force on the rack to move it about its pivot during the major portion of the period of meshing of the rack and pinion, the relative cam and follower movements at the end of movement of the rack, and while it remains in mesh with the pinion, being substantially radial relative to the pivot of the rack with the result that the rack is decelerated to substantially zero velocity prior to disengagement from the pinion, said member so moving to mesh and unmesh the rack and pinion that said pivot of the rack moves approximately toward and from the point of cam and follower engagement of said device and rack to prevent substantial angular movements of the rack during its meshing and unmeshing movements.

6. In a calculating machine, a pinion to which variable additive movements are imparted in the operation of the machine, a movable rack member normally out of engagement with said pinion, a plurality of keys, means actuable by the keys to effect predetermined variable movements of said rack idly past said pinion while out of engagement with the pinion, and means operable in response to, and by reason of, the completion of a key movement to effect displacement of the rack towards said pinion to cause their engagement during the return of the rack to its initial position.

7. In a calculating machine, a pinion to which variable additive movements are imparted in the operation of the machine, a movable rack member normally out of engagement with said pinion, a plurality of keys, means actuable by the keys to effect predetermined variable movements of said rack idly past said pinion while out of engagement with the pinion, means operable in response to, and by reason of, the completion of a key movement to effect displacement of the rack towards said pinion to cause their engagement, means for effecting the return of the rack to its initial position during such engagement, and means for disengaging the rack from the pinion, said last two means being interconnected to cause the rack to come substantially to rest at the end of its driving engagement with said pinion and then to be disengaged therefrom.

8. In a calculating machine, a pinion rotatable about a fixed axis and to which variable additive movements are imparted in the operation of the machine, a movable rack member, means holding said rack member normally out of engagement with said pinion, a plurality of keys, means controlled by the keys to effect variable movements of said rack while out of engagement with said pinion dependent upon the key which may be operated, means, operative only at the completion of such variable movement, to effect bodily movement of the rack towards, and into mesh with, the pinion, and means then operating to effect driving of the pinion by the rack while the rack is returning to its initial position.

9. In a calculating machine, a pinion rotatable about a fixed axis and to which variable additive movements are imparted in the operation of the machine, a movable rack member, means holding said rack member normally out of engagement with said pinion, a plurality of keys, means controlled by the keys to effect variable movements of said rack while out of engagement with said pinion dependent upon the key which may be operated, means, operative at the completion of such variable movement, to effect bodily movement of the rack towards, and into mesh with, the pinion, and means then operating to effect driving of the pinion by the rack while the rack is returning to its initial position, said last means causing the rack to come substantially to rest at the end of its driving engagement with said pinion and then to be disengaged therefrom.

10. In a calculating machine, a pinion to which variable additive movements are imparted in the operation of the machine, a movable rack member normally out of engagement with said pinion, a plurality of keys having different values, means actuable by the keys to effect predetermined variable movements of said rack idly past said pinion while out of engagement with the pinion, and means operable upon the completion of a key movement to effect displacement of the rack towards said pinion to cause their driving engagement during the return of the rack to its initial position, said means for causing driving engagement of the rack with the pinion comprising a bar rotatable by the keys and provided with members corresponding to each key, and means whereby rotation of the bar serves to control engagement of the rack with the pinion, said members and keys being relatively arranged so that the distance moved by any key from its normal position before engaging its member varies according to the value of the key.

11. In a calculating machine, a pinion to which variable additive movements are imparted in the operation of the machine, a movable rack member normally out of engagement with said pinion, a plurality of keys, means actuable by the keys to effect variable movements of said rack while out of engagement with said pinion dependent upon the key which may be operated, and means for effecting driving engagement of the rack with the pinion only at the completion of such variable movements of the rack and for maintaining such engagement while the rack is returning to its initial position, said means for effecting driving engagement of the rack with the pinion comprising a member having connection with said rack to move the rack bodily into mesh with the pinion, means including a spring tensioned by depression of any of the keys for yieldingly urging said member towards a position to effect such meshing during such depression of a key, latch means restraining said member from movement to said position during the depression of a key, and means operable in response to any of said keys when the depression thereof is completed for then releasing said latch means thereby to permit said spring to effect meshing of the rack with the pinion.

12. In a calculating machine, a pinion to which variable additive movements are imparted in the operation of the machine, a movable rack member normally out of engagement with said pinion, a plurality of keys, means actuable by the keys to effect predetermined variable movements of said rack idly past said pinion while out of engagement with the pinion, a spring tensioned by actuation of the keys while such variable movement is being imparted to the rack, means operable by said spring in response to, and by reason of, the completion of a key movement to effect displacement of the rack towards said pinion to cause their engagement during the return of the rack to its initial position, means operable by said spring for effecting movement of the rack to drive the pinion, and means also operable by said spring for effecting disengagement of the rack from the pinion at the end of said driving engagement.

CHRISTOPHER FREDERICK WEBB.